No. 837,542. PATENTED DEC. 4, 1906.
C. BRISTOW.
SEED SOWER.
APPLICATION FILED APR. 25, 1905.
3 SHEETS—SHEET 1.
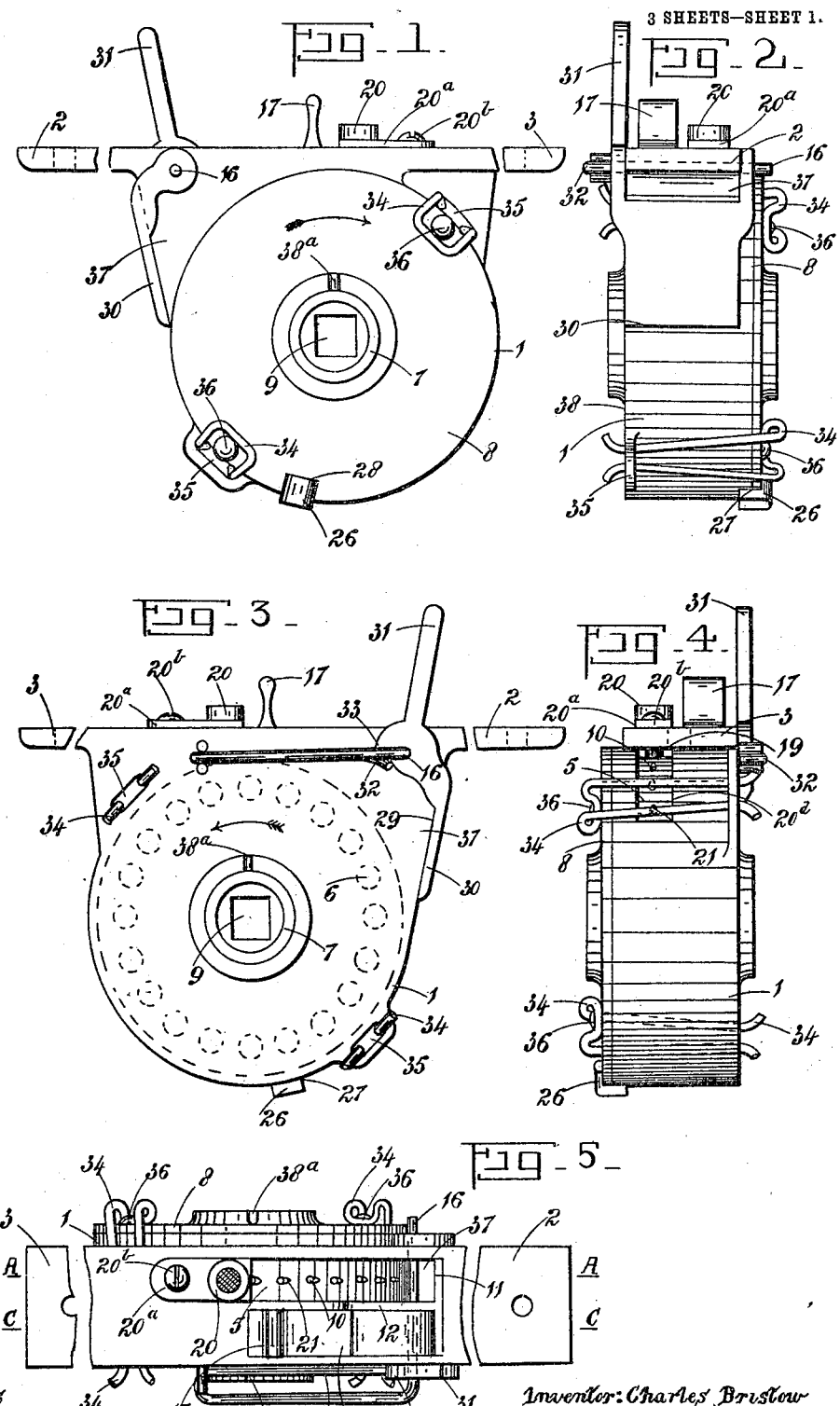

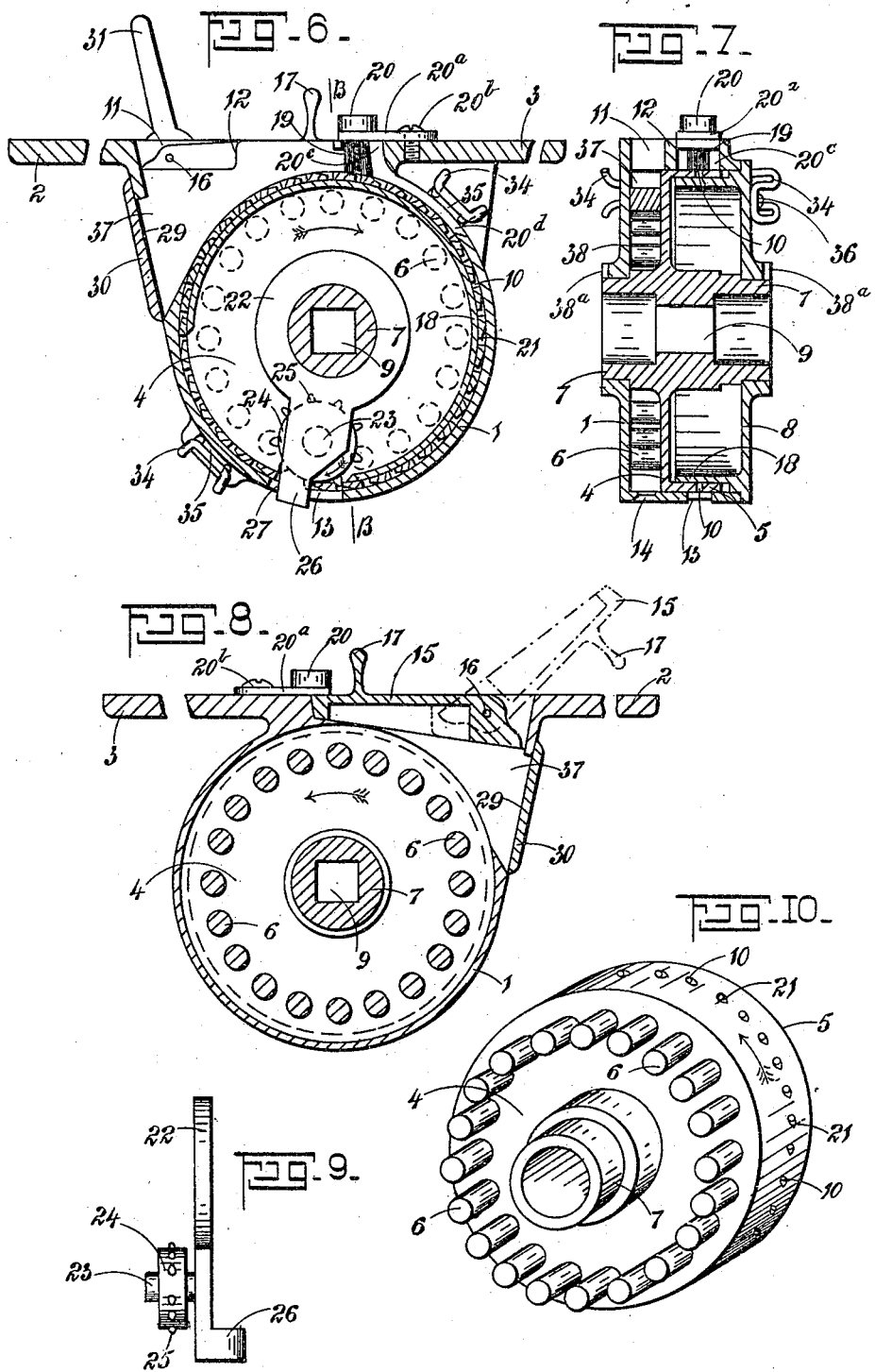

No. 837,542.

PATENTED DEC. 4, 1906.

C. BRISTOW.
SEED SOWER.
APPLICATION FILED APR. 25, 1905.

3 SHEETS—SHEET 3.

Witnesses:
E. S. Baldwin
L. W. Jones

Inventor: Charles Bristow:
By Hewett & Hayward Attorney

UNITED STATES PATENT OFFICE.

CHARLES BRISTOW, OF ADDINGTON, CHRISTCHURCH, NEW ZEALAND.

SEED-SOWER.

No. 837,542.     Specification of Letters Patent.     Patented Dec. 4, 1906.

Application filed April 25, 1905. Serial No. 257,382.

*To all whom it may concern:*

Be it known that I, CHARLES BRISTOW, a subject of His Majesty the King of Great Britain and Ireland, residing at 2 Macaulay street, Addington, Christchurch, in the Provincial District of Canterbury, in the Colony of New Zealand, have invented certain new and useful Improvements in Seed-Sowers, of which the following is a specification.

The invention relates to apparatus employed in connection with seed-drills and similar agricultural implements for the purpose of regulating the sowing of seed.

My invention provides an apparatus whereby seeds of one kind may be sown individually at one and the same time that seeds of another kind are sown broadcast. Thus, for example, turnip-seeds may be sown one by one jointly and simultaneously with the broadcast sowing of rape-seed. By sowing in this manner, as is well known to argiculturists, the rape grows up and protects the turnip-plants from the ravages of flies. Individual sowing or broadcast sowing may either of them be carried out independently. For this purpose a hollow drum is revolubly mounted within a shell which is fixed beneath the main seed-hopper. The drum has a number of holes in its periphery for sowing seeds individually, each of said holes receiving a seed and carrying it to a discharge-opening in said shell. A wheel revolving within the drum has a plurality of projections fitting the holes referred to in the drum, whereby seed is forced out which otherwise might be inclined to remain in the holes. The drum is provided with a ring of laterally-projecting studs by which the seeds are delivered to an orifice at the bottom of the apparatus and sown broadcast.

The seeds are stored in a main seed-hopper which extends from side to side of the implement and is provided with partitions for separating the different kinds of seeds. A diaphragm in the apparatus coincides with a partition of the main hopper, whereby seeds from one side of the partition descend to the holes in the drum and seeds on the other side of the partition fall upon the projecting studs.

The invention also comprises other details and arrangement of parts, as hereinafter fully described, and set forth in the claims.

I will now particularly describe my invention by the aid of the accompanying drawings, wherein—

Figure 11:
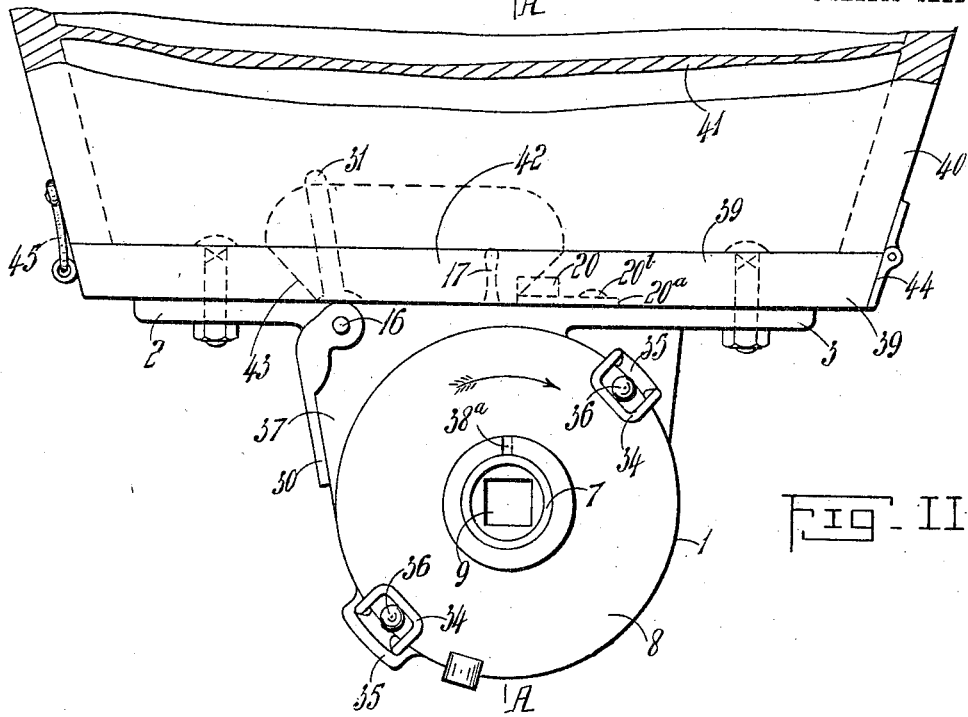

Figure 1 is a near-side elevation; Fig. 2, a front end view; Fig. 3, an off-side elevation; Fig. 4, a rear end view. Fig. 5 is a plan. Fig. 6 is a sectional elevation on line A A, Fig. 5. Fig. 7 is an end sectional elevation on line B B, Fig. 6. Fig. 8 is a vertical section on line C C, Fig. 5, of the apparatus removed from the main hopper. Fig. 9 is an end elevation of the shackle and ejector-wheel. Fig. 10 is an end perspective elevation of the seed-drum. Fig. 11 is a near-side elevation, and Fig. 12 an end sectional elevation, of the apparatus in position on a main seed-hopper.

Similar numerals of reference indicate the same parts throughout the figures.

The shell 1 in the form of a short cylinder with its axis horizontal has the integrally-formed seed-hopper 37, which has the ears 2 and 3, by means of which it is secured beneath the bottom 39 of the main seed-hopper 40. (See Figs. 11 and 12.)

A feed-drum (clearly shown in the perspective view, Fig. 10) comprises a disk 4, having upon one side a laterally-projecting flange 5 upon its circumferential periphery, which revolves within the shell, and upon the other side a ring of laterally-projecting studs 6. The boss 7, projecting from each side of the disk, takes its bearing in a hole bored in the side 38 integral with the shell and in a similar hole bored in a cap 8, which forms a cover for the opposite side of the shell. A square hole 9 through the boss receives a similarly-sided spindle which is driven through suitable gearing (not shown) by the forward travel of the implement and is used to revolve a whole series of feed-drums secured to the bottom of the hopper 40.

The flange 5 is provided with a series of holes 10, each hole being of diameter just sufficiently large to allow a turnip-seed to pass through, the thickness of the flange being approximate to the diameter of a turnip-seed.

Figure 12:
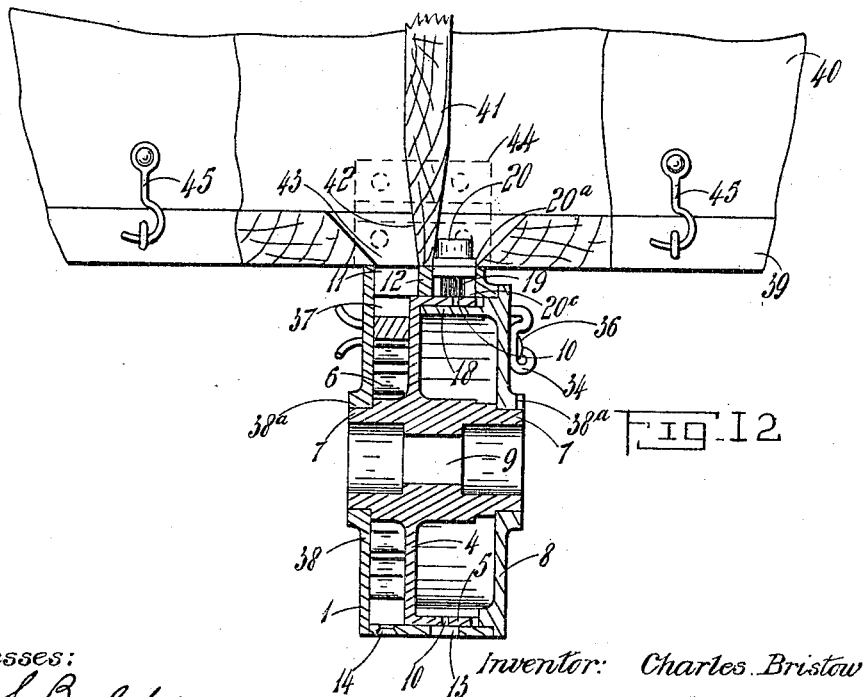

The seed-hopper 37 at the top of the shell and integral therewith has a vertical longitudinal diaphragm 12, dividing it into two compartments, one compartment admitting turnip-seed or the like to the flange 5, each hole therein receiving one seed and carrying it to an orifice 13 at the bottom of the shell, through which it passes to the ordinary delivery-tube of the implement. (Not shown.) The other compartment admits rape or the like seed to the interior of the shell upon one side of the seed-drum which has the studs 6, from whence the seed is delivered through an orifice 14. The main hopper 40 for carrying the seeds to be sown is divided into compartments by partitions, one of which, 41, is shown in Figs. 11 and 12. The partition rests upon the bottom 39 of the hopper 40 and has a part 42 extending into a hole 43 through the bottom 39 till it meets and coincides with the diaphragm 12 of the hopper 37, so that seeds on one side of the partition fall to the holes 10 and seeds on the other side fall to the projecting studs 6.

When it is desired to use the apparatus for sowing one kind of seed only, I provide a cover 15, pivoted upon a cross-spindle 16 and operable by a handle 17 and adapted to close one or other of the compartments by sliding it when raised, as shown by dotted lines in Fig. 8, along said spindle, whereby when sowing turnip-seed the rape-sowing side of the apparatus may be shut off, and vice versa.

The main hopper 40 is raised when it is desired to slide the cover 15 on its spindle 16, and for this purpose the hopper is connected to the bottom 39 by hinges 44 and secured by hooks 45. By leaving the cover 15 raised, as shown by dotted lines in Fig. 8, seeds will be simultaneously sown individually and broadcast, as previously described.

The cap 8 has a laterally-projecting flange 18, which fits the internal circumference of the flange 5 of the drum and extends beneath the holes 10 and is continued around the drum to the orifice 13, the seed being thereby kept in the holes 10 during the revolution of the drum until said holes come successively into correspondence with the orifice 13.

An adjustable brush consisting of bristles 19, secured within a hollow boss 20, made integral with a plate 20$^a$, is secured to the top of the hopper by a screw 20$^b$ and passing through a hole 20$^c$ bears upon the circumference of the flange 5 and clears any in excess of one seed from each hole.

Each of the holes has a small beveled channel 21 in the face of the flange 5 to facilitate the wiping out of superfluous seed. The shell has a slot 20$^d$ to allow dirt accumulating behind the brush to pass away.

A shackle 22, journaled upon the boss 7 within the shell, carries a stud 23, upon which is revolubly mounted an ejector, consisting of a small wheel 24, having projections 25 upon its circumference, the projections being arranged at the same distance apart as the holes 10 and adapted to pass into each of said holes in succession to assist gravity in discharging the seed from the holes.

By referring to Fig. 6 it will be seen that one of the projections 25 is just entering one of the holes 10 immediately after the said hole has passed beyond the end of the flange 18. A small seed is thereby prevented from falling into the interior of the drum.

A projection 26 from the shackle fits into a similarly-shaped hole 27 in the shell to maintain the shackle in position. The projection also fits laterally into a recess 28, formed in the circumference of the cap, any possibility of the cap turning with the revolution of the seed-drum being thereby prevented.

An orifice 29, opening into both compartments, is provided for the withdrawal of seed from the hopper when desired. This orifice is covered by a shutter 30, which is pivoted upon the spindle 16 and operable by a lever 31, the end of a wire spring 32 bearing against a projection 33 from said lever and normally keeping the shutter closed.

The cap is secured to the shell by the bent wire-spring hooks 34, which pass through eyes 35 upon the shell (their ends being bent apart to prevent them from being drawn through the eye) and hook at their other ends over small bosses 36, projecting from the face of the cap.

Grooves 38$^a$ are made in the faces of the boss of the drum for oiling purposes.

What I claim, and desire to secure by Letters Patent of the United States, is—

1. In an apparatus for the purpose indicated in combination a shell, a feed-drum revolubly mounted therein and having a circumferential flange, a series of holes through said flange each of a size adapted to receive one of the seeds to be sown, a cap forming a cover for one end of the shell, a laterally-projecting flange upon the cap and adapted to fit part of the internal circumference of the feed-drum; a shackle centered loosely upon the boss of the feed-drum, a stud projecting therefrom, a wheel revolubly mounted upon said stud and projections from the circumference of said wheel adapted to enter in succession each of the holes in the feed-drum substantially as and for the purposes herein described.

2. In an apparatus for the purpose indicated an ejector comprising a shackle centered loosely upon the boss of a feed-drum having a stud upon which revolves a small wheel, said wheel carrying projections upon its circumference made to pitch with holes perforated through said feed-drum substantially as and for the purposes herein specified.

3. In an apparatus for the purpose indicated in combination, a shell, a feed-drum fitting said shell and revoluble therein, said drum comprising a disk having a laterally-projecting flange upon its circumferential periphery, a boss projecting from each side of said disk and journaled on one side in a hole in the side of the shell, a cap adapted to close the opposite side of the shell, and to form a bearing for the boss on the other side of the disk, said cap having a laterally-projecting flange adapted to fit part of the internal circumference of the feed-drum, the feed-drum having a series of holes each of a size to contain one of the seeds to be sown, substantially as and for the purposes herein specified.

4. In an apparatus for the purpose indicated in combination a shell, a feed-drum fitting said shell and revoluble therein, said feed-drum having a flange upon its circumferential periphery with holes in said flange each adapted to carry one of the seeds to be sown, and said feed-drum having also a ring of studs projecting laterally from its face and means for supplying seed to the holes in the feed-drum and to the side of the drum which carries the lateral projections; a shell having orifices near the bottom for the discharge of seed substantially as and for the purposes herein described.

5. In an apparatus for the purpose indicated a shell a feed-drum revoluble therein, said feed-drum comprising a disk having a ring of laterally-projecting studs with means for revolving said feed-drum, the shell having apertures for admission and delivery of seed substantially as and for the purposes described.

6. In an apparatus for the purpose indicated in combination a shell, a feed-drum revolubly mounted therein and having a circumferential flange, a series of holes through said flange each of a size adapted to receive one of the seeds to be sown, a cap forming a cover for one end of the shell, a laterally-projecting flange upon the cap and adapted to fit part of the internal circumference of the feed-drum; a shackle centered loosely upon the boss of the feed-drum, a stud projecting therefrom, a wheel revolubly mounted upon said stud and projections from the circumference of said wheel adapted to enter in succession each of the holes in the feed-drum, a brush fixed to the hopper and extending to the top of the drum, the shell being provided with a slot behind the brush, substantially as set forth.

7. In an apparatus for the purpose indicated, a shell provided with eyes, a cover for the shell provided with bosses, spring-hooks adapted at one end to hook upon the said bosses and at their other end to engage the said eyes, substantially as set forth.

In testimony whereof I have signed my name to this specification in the presence of two witnesses.

CHARLES BRISTOW.

Witnesses:
E. P. O'DONNELL,
J. J. WATSON.